Jan. 12, 1965     P. HIMMELSBACH     3,165,044

CONTROL MECHANISM FOR THE COMPONENTS OF OPTICAL OBJECTIVES

Filed Aug. 17, 1961

PAUL HIMMELSBACH
*INVENTOR.*

BY

AGENT

United States Patent Office 3,165,044
Patented Jan. 12, 1965

3,165,044
CONTROL MECHANISM FOR THE COMPONENTS
OF OPTICAL OBJECTIVES
Paul Himmelsbach, Bad Kreuznach, Germany, assignor to
Jos. Schneider & Co. Optische Werke, Bad Kreuznach,
Germany, a corporation of Germany
Filed Aug. 17, 1961, Ser. No. 132,029
Claims priority, application Germany, Aug. 20, 1960,
Sch 28,362
3 Claims. (Cl. 95—45)

My present invention relates to a control mechanism for the axial displacement of the components of optical objectives, e.g. on photographic or cinematographic cameras, for adjustment purposes.

In the case of lenses or lens assemblies having considerable freedom of movement, as with varifocal systems, it is often convenient to provide a source of power for effecting the desired adjustments; this is particularly true with varifocal objectives requiring simultaneous displacement of two or more components at different rates by the rotation of a common control member, such as a slotted camming sleeve, which can be manually moved only with considerable effort.

It is, therefore, an object of my present invention to provide a compact electric control mechanism, suitable for use with a photographic or motion-picture camera, for the selective displacement of optical components and, more particularly, for use in a system for varying the effective focal length of a photographic or cinematographic objective.

It is a more particular object of this invention to provide an electric control mechanism for the aforestated purpose in which the movable component or components are automatically arrested in one or the other limiting position of their range of displacement.

A further object of the instant invention, allied with the preceding one, is to provide simple means for adjusting the aforementioned limiting positions.

The foregoing objects are realized, in accordance with this invention, by the provision of a reversible electric motor mounted on an objective housing, together with a preferably portable source of current therefor such as a battery, for rotating a control member in one or the other direction upon the closure of a respective set of contacts, the motor circuit including a pair of limit switches arranged to be opened by the control member in selected positions of angular displacement.

In a particularly advantageous embodiment I utilize a single leaf spring as a common contact member for both limit switches, this leaf spring being accommodated in a sectoral extension of the objective housing which also contains the driving motor and, preferably, the power source therefor.

The invention will be described in greater detail with reference to the accompanying drawing in which.

Figure 1:
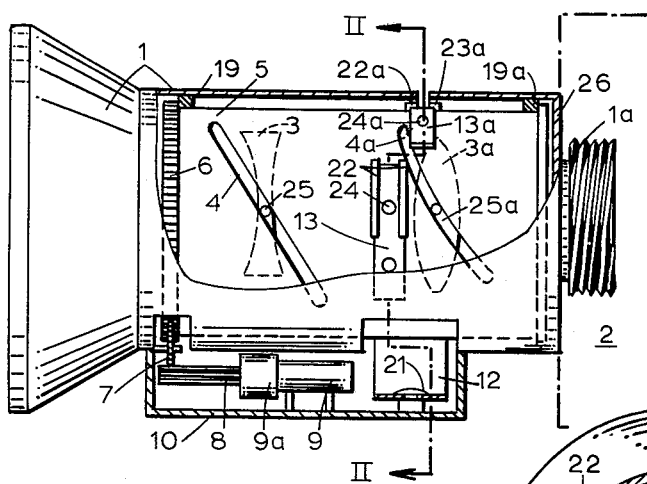
FIG. 1 is a side-elevational view, with parts broken away, of an optical objective incorporating an electric control mechanism according to the invention.
Figure 2:
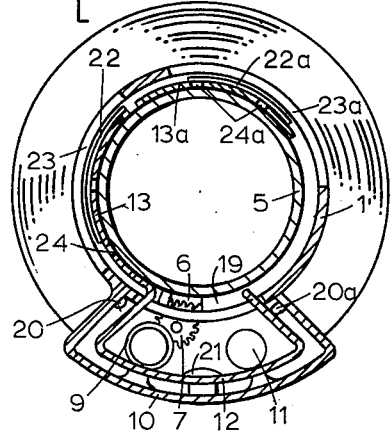
FIG. 2 is a cross-sectional view taken on the line II—II of FIG. 1.

The objective system illustrated in FIGS. 1 and 2 comprises a generally cylindrical housing 1 terminating at its rear in a threaded shoulder 1a for attachment to the body of a camera indicated schematically at 2. The housing contains the objective proper which is of the varifocal type and of which only a movable negative component 3 and a movable positive component 3a have been shown. These two components are axially displaceable, at different rates, by a camming sleeve 5 coaxial with housing 1 and rotatably held therein against axial displacement by rings 19, 19a engaging a ring gear 6 and a flange 26 on opposite ends of the sleeve. Camming slots 4 and 4a in the periphery of sleeve 5, differing in configuration, are respectively engaged by studs 25, 25a on lenses 3 and 3a; the lenses are axially guided and held against rotation by conventional means not further illustrated.

Ring gear 6 rigid with sleeve 5 meshes with a pinion 7 which in turn engages the toothed shaft 8 of a motor 9 provided with a speed reducer 9a. Motor 9, together with step-down transmission 9a and pinion 7, is received in a sectoral extension 10 of housing 1 which also contains a battery 11 for supplying power to the motor; the relative arrangement of the parts 1, 10 may be similar to that illustrated in my pending design-patent application Ser. No. 64,535 filed March 29, 1961, now Patent No. D.192,706.

Insulatedly carried within housing extension 10 on opposite sides thereof are a pair of switch contacts 20, 20a normally in conductive engagement with the bent-over extremities of a generally U-shaped leaf spring 12 which is fastened to the holder 10 by a stud 21 and whose main portion is curved coaxially with the objective housing. Sleeve 5 carries on its outer peripheral surface a pair of arcuate circuit-breaker strips 13, 13a which are aligned with the ends of spring 12 so as to deflect them away from their associated switch contacts 20 and 20a, respectively, whenever the sleeve is in one or the other of two limiting angular positions of which one has been illustrated in FIG. 2. The strips 13, 13a are, advantageously, adjustable, as by being frictionally held between guide rails 22, 22a in alignment with arcuate peripheral slots 23, 23a in housing 1 so as to be movable with the aid of a pin or key inserted through these slots into holes 24, 24a thereof. More elaborate means for adjustably maintaining these strips in selected angular positions on sleeve 5 may, of course, be provided instead of the simple arrangement illustrated.

Figure 3:
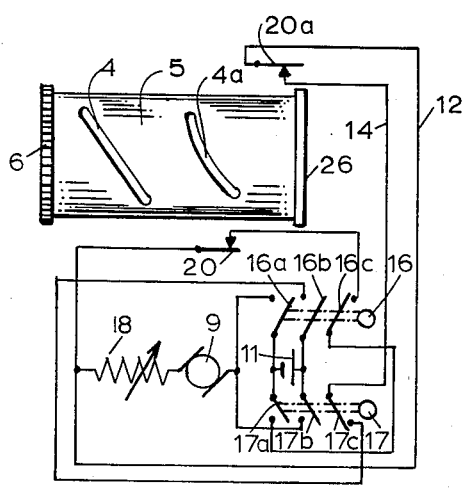
FIG. 3 is a circuit diagram for the control mechanism.

As shown in the circuit arrangement of FIG. 3, motor 9 is connected by way of an adjustable speed-regulating resistor 18 to a conductor represented by the spring 12. Two push buttons 16 and 17, conveniently located externally on housing 1, 10 along with a knob (not shown) for adjusting the resistor 18, each control three armatures 16a, 16b, 16c and 17a, 17b, 17c, respectively; armatures 16a, 17a and 16b, 17b are respectively connected to the negative and the positive pole of battery 11. The make contacts of armatures 16b and 17a are connected via break contacts of armatures 17c and 16c to conductors 14 and 15 leading to the switches 20a and 20, respectively; the make contacts of armatures 16a and 17b are returned to the input terminal of motor 9 opposite the one tied to resistor 18.

If sleeve 5 is in an intermediate position, both limit switches 20, 20a are closed. Actuation of push button 16 then completes a circuit for the clockwise rotation (as viewed in FIG. 2) of the sleeve which can be traced from the positive pole of battery 11 through armature 16b on its make contact, break contact and armature 17c of unoperated push button 17, conductor 14, switch 20a, spring 12, resistor 18, motor 9, make contact and armature 16a to the negative battery terminal. This circuit is broken as soon as the projecting end of strip 13a deflects the spring 12 away from switch contact 20a whereupon rotation stops.

With switch 20 closed in either the limiting position just described or an intermediate position of the sleeve, actuation of push button 17 closes a circuit for energizing the motor 9 in a sense to rotate sleeve 5 counterclockwise; the latter circuit extends from positive battery through armature 17b and associated make contact, motor 9, resistor 18, spring 12, switch 20, conductor 15, break contact and armature 16c of push button 16 in unoperated position, make contact and armature 17a to negative battery. The motor stops when the sleeve arrives in the limiting position illustrated in FIG. 2, the leading edge of strip 13 then deflecting the spring 12 away from switch contact 20. The cycle may then be repeated by another operation of push button 16.

The strips 13, 13a are shown to be relatively staggered in axial direction so that their positions can be adjusted idependently of each other. This arrangement, accordingly, affords great flexibility in the presetting of two positions of focal adjustment which can be alternately selected by the actuation of the respective controls 16, 17.

My invention is, of course, not limited to the specific embodiment described and illustrated but may be realized in various modifications and adaptations without departing from the spirit and scope of the appended claims.

I claim:

1. In an optical objective having a pair of displaceable components, in combination, a generally cylindrical housing provided with a sectoral outward extension, a rotatable camming sleeve in said housing coupled with said components, an electric motor for rotating said sleeve, a source of electric energy for said motor in said extension, an operating circuit including contact means selectively actuatable for reversibly energizing said motor from said source, and a pair of limit switches respectively controlled by said sleeve in two extreme angular positions thereof in series with said contact means for deactivating said motor, said limit switches including a pair of contacts mounted in said housing at peripherally spaced locations of said extension and a curved leaf spring of generally U-shaped configuration in said extension having extremities normally engaging said contacts, respectively, said sleeve being provided with two external projections engageable with said extremities in said angular positions for respectively deflecting them away from said contacts, said leaf spring lying close to the inner wall of said extension and being centrally secured to said wall.

2. The combination according to claim 1 wherein said projections are formed by a pair of arcuate strips hugging said sleeve while beinng independently adjustable thereon.

3. The combination according to claim 1 wherein said source comprises an electric battery lodged in said extension alongside said motor.

References Cited by the Examiner
UNITED STATES PATENTS

| | | | |
|---|---|---|---|
| 2,307,479 | 1/43 | Annick | 88—24 |
| 2,838,600 | 6/58 | Salinger | 95—45 |
| 2,924,146 | 2/60 | Back | 95—45 X |
| 2,989,906 | 6/61 | Rentschler | 95—11 |

NORTON ANSHER, *Primary Examiner.*

JAMES W. LOVE, JOHN M. HORAN, *Examiners.*